US012662310B2

(12) United States Patent
Heggebø

(10) Patent No.: US 12,662,310 B2
(45) Date of Patent: Jun. 23, 2026

(54) STORAGE CONTAINER ASSEMBLY

(71) Applicant: Autostore Technology AS, Nedre Vats (NO)

(72) Inventor: Jørgen Djuve Heggebø, Langhus (NO)

(73) Assignee: AutoStore Technology AS, Nedre Vats (NO)

( * ) Notice: Subject to any disclaimer, the term of this patent is extended or adjusted under 35 U.S.C. 154(b) by 344 days.

(21) Appl. No.: 18/546,681

(22) PCT Filed: Feb. 22, 2022

(86) PCT No.: PCT/EP2022/054384
§ 371 (c)(1),
(2) Date: Aug. 16, 2023

(87) PCT Pub. No.: WO2022/180025
PCT Pub. Date: Sep. 1, 2022

(65) Prior Publication Data
US 2024/0140703 A1 May 2, 2024

(30) Foreign Application Priority Data
Feb. 24, 2021 (NO) .............................. NO20210248

(51) Int. Cl.
B65G 1/04 (2006.01)
B65D 6/06 (2006.01)
B65D 77/04 (2006.01)
(52) U.S. Cl.
CPC ............ B65G 1/0464 (2013.01); B65D 11/12 (2013.01); B65D 77/0453 (2013.01)
(58) Field of Classification Search
CPC ........ B65G 1/0464; B65G 1/065; B65G 1/04; B65D 11/12; B65D 77/0453
See application file for complete search history.

(56) References Cited

U.S. PATENT DOCUMENTS 2,253,475 A * 8/1941 Willber ................... D06F 58/14
312/297
2,573,602 A * 10/1951 Regenhardt ............ A47B 87/02
312/111
(Continued)

FOREIGN PATENT DOCUMENTS

CN 101208492 A 6/2008
CN 101208568 A 6/2008
(Continued)

OTHER PUBLICATIONS

International Search Report issued in corresponding International Application No. PCT/EP2022/054384, mailed on Jun. 29, 2022 (4 pages).

(Continued)

*Primary Examiner* — Michael Collins
(74) *Attorney, Agent, or Firm* — Baker Botts L.L.P.

(57) ABSTRACT

A storage container assembly includes a storage container, a delivery container, and a holder. The storage container includes a base and four walls extending up from edges of the base, thereby defining a top opening of the storage container. The delivery container includes a base and four walls extending up from edges of the base. The holder for the delivery container is telescopically retained within the storage container and extendable from the opening of the storage container. The holder has a side-access opening, which is revealed on extension of the holder from the storage container. The delivery container can be guided into and out from the side-access opening of the holder and the delivery container can be slidably retained within the holder for storage within the storage container.

11 Claims, 10 Drawing Sheets

(56) References Cited

U.S. PATENT DOCUMENTS

| | | | | |
|---|---|---|---|---|
| 5,385,400 | A * | 1/1995 | Chen | B25H 3/021 |
| | | | | 220/8 |
| 6,782,711 | B2 * | 8/2004 | Abfalter | F25D 3/08 |
| | | | | 62/457.7 |
| 2006/0276768 | A1 | 12/2006 | Miller et al. | |
| 2011/0061336 | A1 * | 3/2011 | Thomas | E04B 1/10 |
| | | | | 52/745.19 |
| 2011/0121695 | A1 | 5/2011 | Purdy | |
| 2015/0127143 | A1 * | 5/2015 | Lindbo | G05B 15/02 |
| | | | | 700/218 |
| 2016/0129587 | A1 | 5/2016 | Lindbo et al. | |
| 2018/0319590 | A1 | 11/2018 | Lindbo et al. | |

FOREIGN PATENT DOCUMENTS

| | | | |
|---|---|---|---|
| CN | 205169128 | U | 4/2016 |
| CN | 107972978 | A | 5/2018 |
| CN | 108466735 | A | 8/2018 |
| CN | 209814597 | U | 12/2019 |
| EP | 2380813 | A1 | 10/2011 |
| GB | 2577702 | A | 4/2020 |
| JP | 2000125958 | A | 5/2000 |
| JP | 2019059624 | A | 4/2019 |
| NO | 317366 | B1 | 10/2004 |
| NO | 344750 | B1 | 4/2020 |
| WO | 2014/075937 | A1 | 5/2014 |
| WO | 2014/090684 | A1 | 6/2014 |
| WO | 2015/193278 | A1 | 12/2015 |
| WO | 2018/146304 | A1 | 8/2018 |
| WO | 2019/238642 | A1 | 12/2019 |

OTHER PUBLICATIONS

Written Opinion issued in corresponding International Application No. PCT/EP2022/054384, mailed on Jun. 29, 2022 (11 pages).
International Search Report issued in corresponding International Application No. PCT/EP2022/054384, mailed on Nov. 8, 2022 (4 pages).
Written Opinion issued in corresponding International Application No. PCT/EP2022/054384, mailed on Nov. 8, 2022 (11 pages).
Search Report issued in counterpart Norwegian U.S. Appl. No. 20/210,248 mailed on Sep. 24, 2021 (2 pages).
Wu, Peizhen, Office Action in CN202280016491.1, mailed Jul. 21, 2025, 19 pages, The State Intellectual Property Office of the People's Republic of China, Beijing, China.
Yazawa, Shuichiro, Office Action in JP2023546429, mailed Sep. 8, 2025, 7 pages, Japan Patent Office, Tokyo, Japan.
Anh, Le Huy, Office Action in VN1202306483, mailed Oct. 23, 2025, 4 pages, Intellectual Property Office of Vietnam, Hanoi, Vietnam.
Anonymous, Office Action in KR1020237032205, mailed Feb. 11, 2026, 15 pages, Korean Intellectual Property Office, Daejeon, Korea.

* cited by examiner

106

106r

106b

106o

106a

106c

10

30

40

20

S1

10

30

A

40

20

S2

S3

S4

STORAGE CONTAINER ASSEMBLY

FIELD OF THE INVENTION

The present invention relates to a storage container assembly. The present invention also relates to an automated storage and retrieval system comprising a framework structure. The present invention also relates to a method for unloading of a delivery container from, or for loading of the delivery container into, a storage container of an automated storage and retrieval system.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Parts of the gripping device of the container handling vehicle 301 are shown in FIG. 3 indicated with reference number 304. The gripping device of the container handling device 201 is located within the vehicle body 201a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in Wo2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

NO344750 describes an unloading arrangement, an unloading station, and a method of unloading an item from a storage container, comprising: a delivery vehicle; a storage container carried by the delivery vehicle; and an unloading station for unloading an item from the storage container while it is being carried by the delivery vehicle in an automatic storage and retrieval system. The unloading station comprises an unloading device; and a destination conveyor configured to convey the item to a target destination, wherein the unloading device is configured to move the item through a side opening of the storage container to the destination conveyor. The item may here be a product item or a shipping package in which one or more product items are packed for shipping.

One object of the present invention is to provide a storage container assembly with a storage container in which a delivery container can be stored.

One object of the present invention is to provide an automated storage system in which such a storage container assembly can be utilized.

SUMMARY OF THE INVENTION

The present invention relates to a storage container assembly comprising:

a storage container comprising a base and four walls extending up from edges of the base, thereby defining a top opening of the storage container;

a delivery container comprising a base and four walls extending up from edges of the base;

a holder for the delivery container being telescopically retained within the storage container and extendable from the opening of the storage container, the holder having a side-access opening which is revealed on extension of the holder from the storage container, wherein the delivery container can be guided into and out from the side-access opening of the holder and wherein the delivery container can be slidably retained within the holder for storage within the storage container.

In one aspect, the four walls extending up from edges of the base define a top opening of the delivery container, thereby allowing access to the delivery container through the top opening of the storage container. However, the delivery container may also have a closed top, in which case there is no access to the interior of the delivery container. The closed top may be provided by a lid. The closed top may also be provided by flaps of the delivery container which are folded over the top opening and fastened to the delivery container.

In one aspect, the holder comprises a plurality of vertical members coupled to each other, the vertical members being movably engaged with and guided by vertical guides of the storage container.

In one aspect, the holder comprises a top frame and a bottom frame, wherein the plurality of vertical members are coupled to each other and are held in vertical alignment by means of the top frame and the bottom frame.

In one aspect, the vertical members comprise a number of vertical ribs or posts spaced apart. In one aspect, the vertical members are arranged pairwise on opposing sides of the holder. The holder may be considered as a cage. Alternatively, each vertical member may be connected to the next by means of vertical plate elements, e.g., formed as part of a panel, either as an alternative to, or in addition to, the top frame and the bottom frame.

In one aspect, the top frame and the bottom frame are rectangular.

In one aspect, the bottom frame may have a central opening or may be provided as a panel without openings. The top frame has a central opening for providing access to contents of the delivery container.

In one aspect, the holder comprises a horizontal guide for guiding the delivery container into and out from a side-access opening of the holder.

In one aspect, the horizontal guide is provided by the bottom frame guiding the base of the delivery container.

In one aspect, the horizontal guide is provided by guiding features provided as part of the respective vertical members, wherein the guiding features are movably engaged with corresponding guiding features provided as part of two of the walls of the delivery container.

The guiding features of the vertical members and the guiding features of the delivery container may comprise recesses, projections etc. allowing horizontal movement of the delivery container relative to the holder while preventing relative vertical movement of the delivery container relative to the holder.

In one aspect, the storage container assembly is configured to be in the following states:

an first state in which the delivery container is retained within the holder and in which the holder is telescopically retained into the storage container;

a second state in which the delivery container is retained within the holder and in which the holder, together with the delivery container, is extended telescopically from the storage container;

a third state, in which the delivery container has been guided horizontally at least partially out from the side-access opening in the holder.

Preferably, the delivery container has been moved entirely out from the side-access opening in the holder and is separated from the holder and the storage container in the third state.

The holder may be loaded with the same or a different delivery container again, before the holder is telescopically retained into the storage container. The storage container assembly is now considered to be in the first state again.

Alternatively, holder may be telescopically retained into the storage container without any delivery container. The storage container with the holder may now be used in the same way as the known storage container until there is a need to use the storage container with the holder to receive a delivery container again. In yet an alternative, the holder may also be removed from the storage container before the storage container is used as the known storage container. The storage container may be a prior art storage container. Hence, it is possible to retrofit existing storage containers with holders and delivery containers.

Accordingly, the storage container assembly achieves flexibility with respect to its use. The holder occupies little space of the storage container, allowing efficient storage both when storing product items in the delivery container and when storing product items directly in the storage container.

In one aspect, the storage container of the storage container assembly comprises upper and lower stacking interfaces similar to the known storage containers, thereby allowing the storage container assembly to be stacked in the same stacks as the storage containers. It should be noted that the storage container assembly is in its first state when being stacked.

In one aspect, the storage container of the storage container assembly comprises a connection interface configured to be connected to a container handling vehicle. Hence, the storage container assembly can be moved by means of the container handling vehicles in the same way as the storage containers.

The present invention also relates to an automated storage and retrieval system comprising a framework structure, wherein the framework structure comprises:

upright members;

a storage volume comprising storage columns provided between the upright members, wherein storage containers are stacked in stacks within the storage columns;

a rail system provided on top of the upright members;

container handing vehicles arranged for movement on the rail system;

characterized in that:

storage container assemblies according to any one of claims 1-7 are stacked in the stacks and handled in the same way as the storage containers by means of the container handing vehicles.

In one aspect, the system further comprises a loading and/or unloading station comprising:

a first actuator for extending the holder telescopically relative to the storage container;

a second actuator for moving the delivery container relative to the holder.

The unloading station may be a station separate from the loading station. Preferably, the station is an unloading and loading station where both unloading and loading takes place.

As above, it is possible to retrofit an automated storage and retrieval system with an loading and/or unloading station in an easy way.

The present invention also relates to a method for unloading of a delivery container from, or for loading of the delivery container into, a storage container of an automated storage and retrieval system, wherein the method comprises the following steps:

moving the storage container from its storage position to a unloading and/or loading station;

extending a holder through a top opening of the storage container;

guiding a delivery container into and/or out from a side-access opening of the holder.

In one aspect, the holder is extending in a vertical direction through the top opening of the storage container. The delivery container is guided horizontally into or out from the side-access opening of the holder.

It should be noted that the storage container and the delivery container typically are of the "open-top" type of container, i.e. a container where its content is accessed through an opening in the top of the container and where its content will fall out when the container is turned upside down. Hence, the base of the containers will typically be oriented horizontally or substantially horizontally relative to ground, to avoid that the content will fall out. The term "horizontal" is here referring to an orientation of the containers when in normal use. The term "vertical" will refer to an orientation perpendicular to the horizontal orientation of the containers when in normal use.

The delivery container may be a container used to transport product items from the automated storage and retrieval system to a next destination. The next destination may for example be a grocery which are using standardized delivery containers. Such delivery containers are also referred to as a tote. Alternatively, the delivery container may be a container used for vertical farming. In yet an alternative, the delivery container may also be a packaging container, for example a cardboard box.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
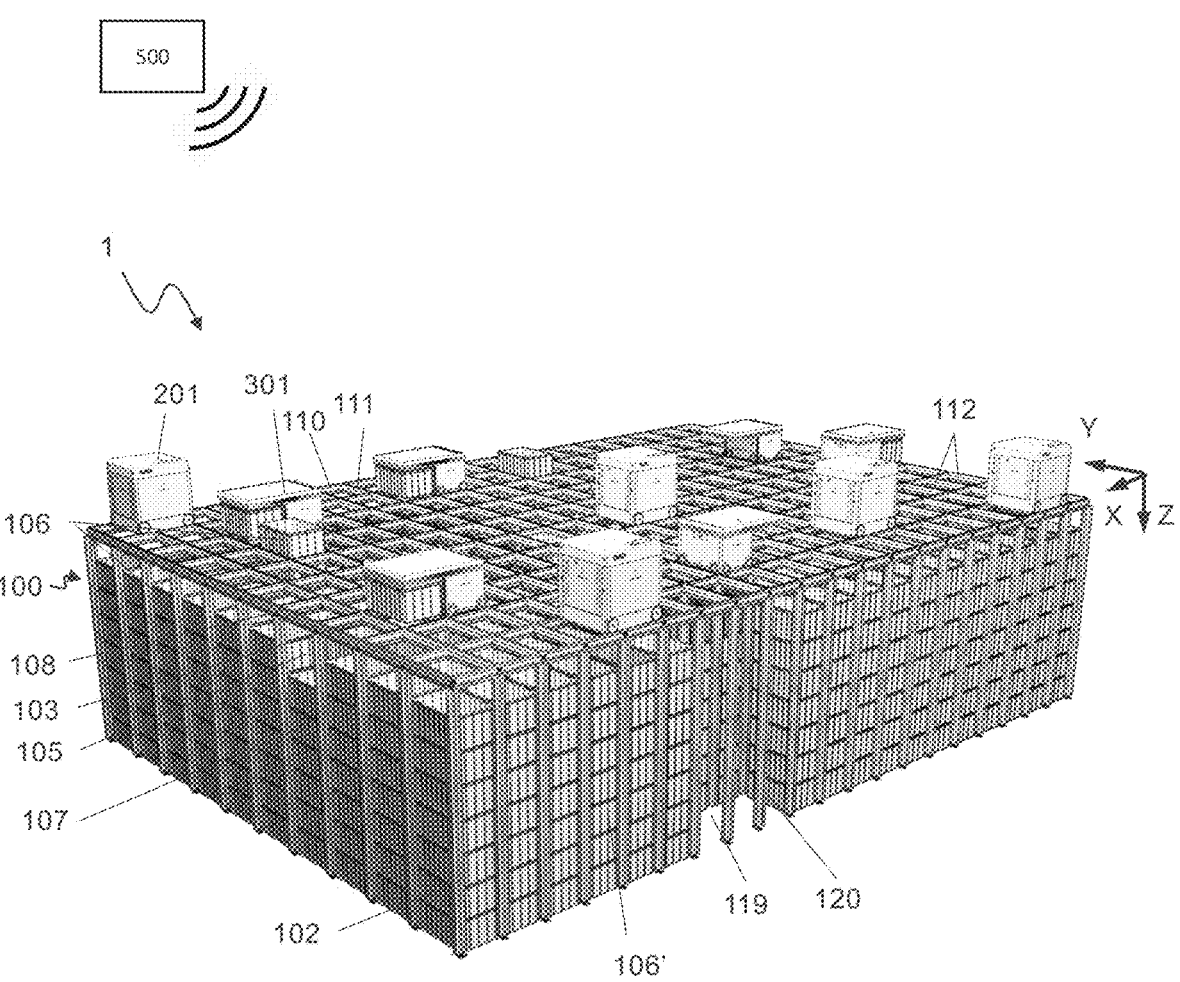
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
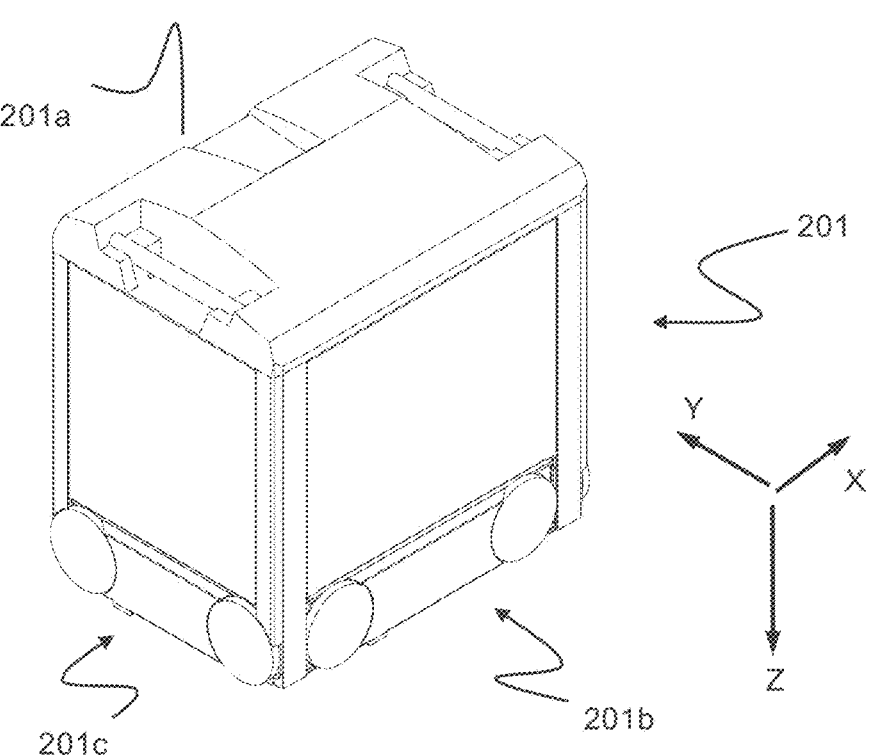
FIG. 2 is a perspective view of a prior art container handling vehicle having a centrally arranged cavity for carrying storage containers therein.
Figure 3:
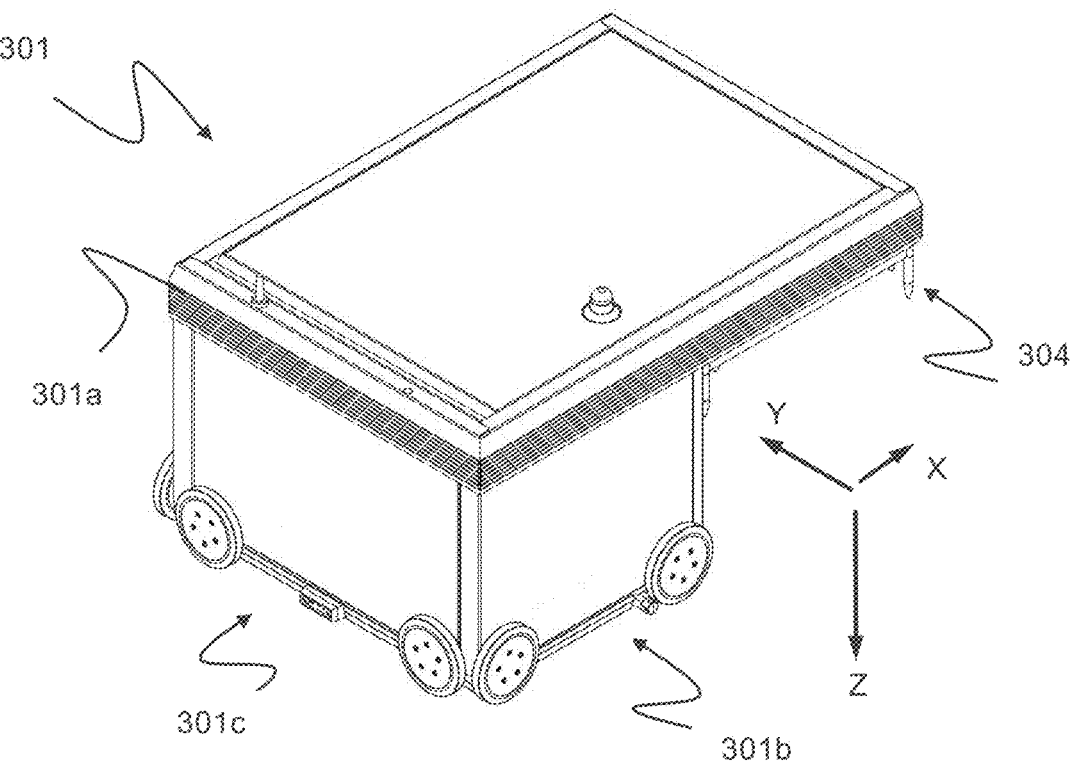
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 4:
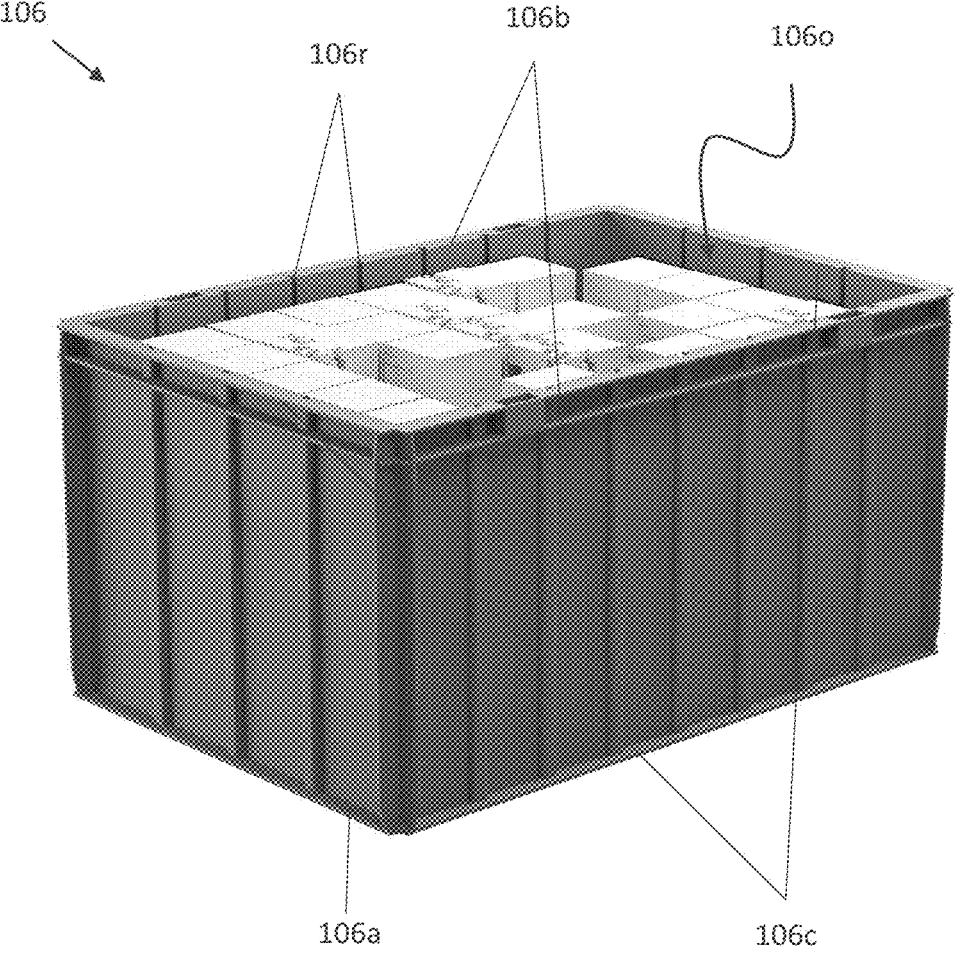
FIG. 4 is a perspective view of a prior art storage container with internal recesses, where the internal recesses may be used for internal separation walls, separating the storage compartment within the container into smaller sub-compartments.

Initially, it is referred to FIG. 4, showing a prior art storage container 106 comprising a base 1060a and four walls 106b, 106c extending up from edges of the base 106a, thereby defining a top opening 106o of the storage container 106. On the inside surface of the walls 106b, 106c internal vertical recesses 106r are made. These internal vertical recesses may be used for internal separation walls, separating the storage compartment within the storage container 106 into smaller sub-compartments.

Figures 5, 6:
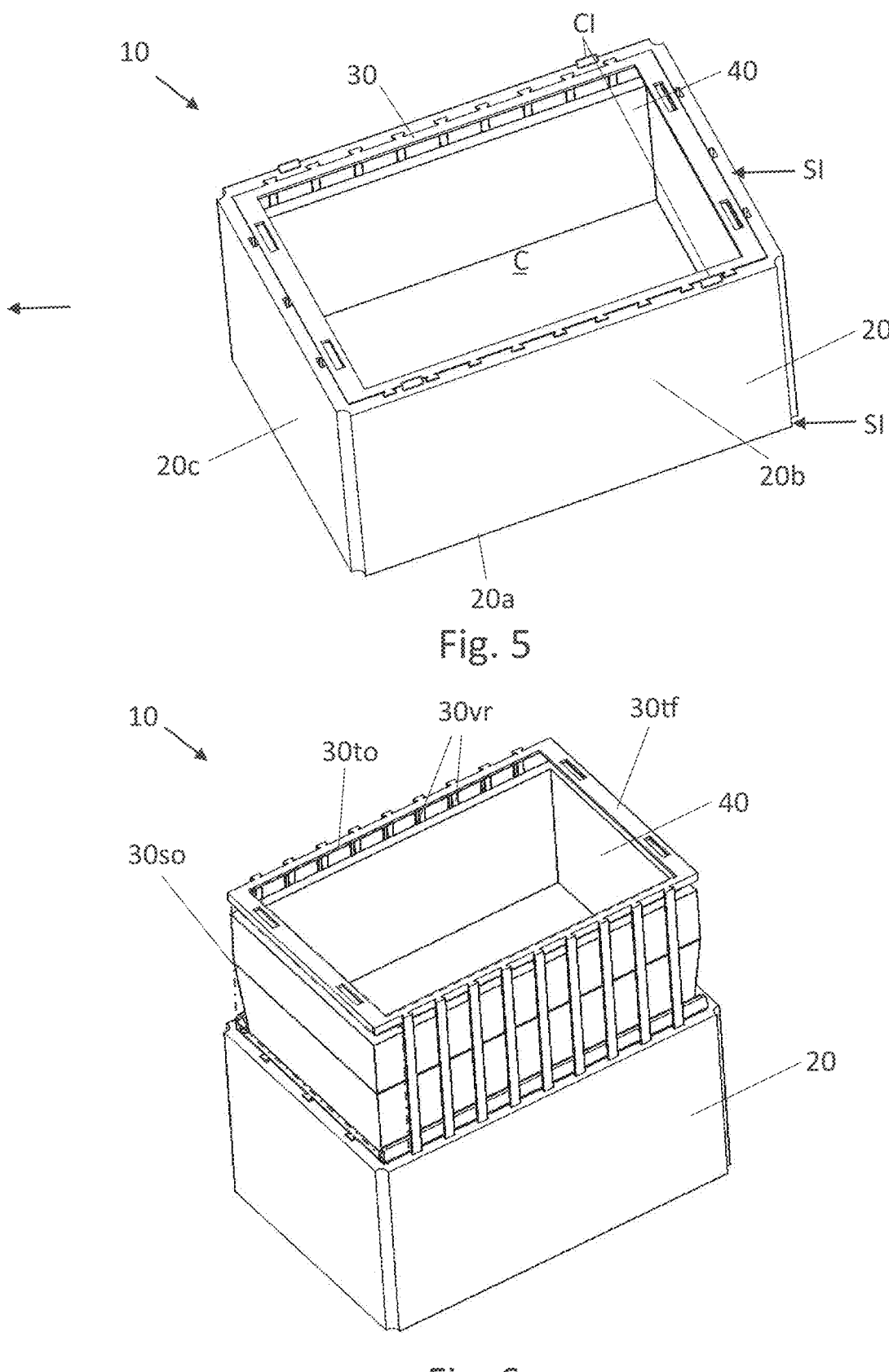
FIG. 5 illustrates a perspective view of a storage container assembly in a first state.
FIG. 6 illustrates a perspective view of the storage container assembly in a second state.

It is now referred to FIGS. 4, 5 and 6, where a storage container assembly 10 is shown. The storage container assembly 10 comprises three main parts, a storage container 20, a holder 30 and a delivery container 40.

The Storage Container 20

The storage container 20 comprises a base 20a and four walls 20b, 20c extending up from edges of the base 20a, thereby defining a top opening 20o of the storage container 20. The storage container 20 may be a known storage container 106 as described above and shown in FIG. 4. However, the storage container 20 may also be a storage container 20 different from the know storage container 106.

In the present embodiment, two walls 20b comprises vertical guides 20r. These vertical guides are similar to the internal vertical recesses 106*r* of the known storage container 106. However, the vertical guides 20*r* may also have a different shape than a recess, they may for example protrude from the walls 20*b* instead of being shaped as recesses in the interior of the walls 20*b*.

In an alternative embodiment, there are no recesses or protrusions, and the guiding function of the vertical guides 20*r* are provided by the internal surfaces of the walls 20*b*, 20*c*.

The storage container 20 comprises upper and lower stacking interfaces SI similar to the known storage containers 106, thereby allowing the storage container assembly 10 to be stacked in the same stacks 107 as the storage containers 106. The configuration of the stacking interface SI is considered known from prior art and will not be described further in detail.

The storage container 20 comprises a connection interface CI configured to be connected to a container handling vehicle 201, 301. Hence, the storage container assembly 10 can be moved by means of the container handling vehicles 201, 301 in the same way as the storage containers 106. The connection interface CI is considered known from prior art and will not be described further in detail.

The Delivery Container 40

Figure 7:
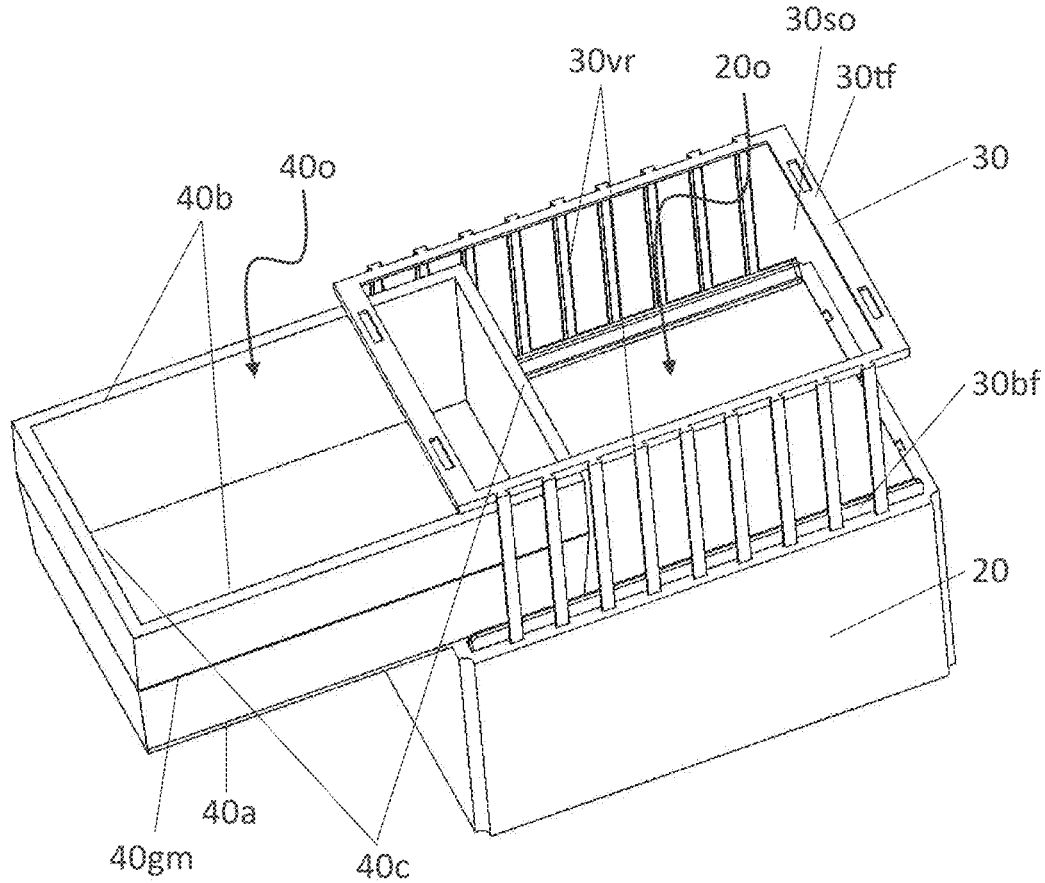
FIG. 7 illustrates a perspective view of the storage container assembly in a third state.
Figure 8A:
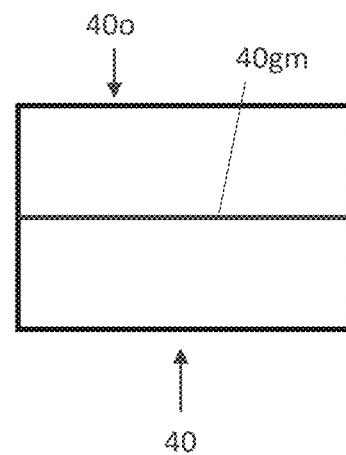
FIG. 8a illustrates a side view of a delivery container.
Figure 8B:
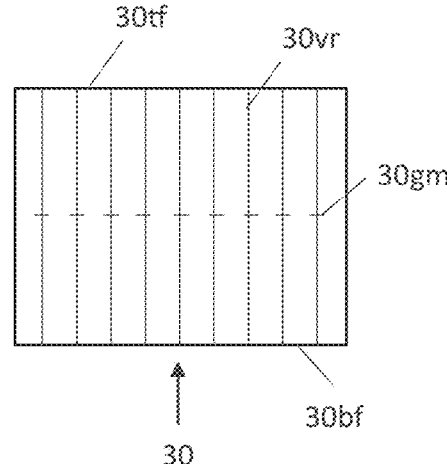
FIG. 8b illustrates a side view of a rib structure.
Figure 8C:
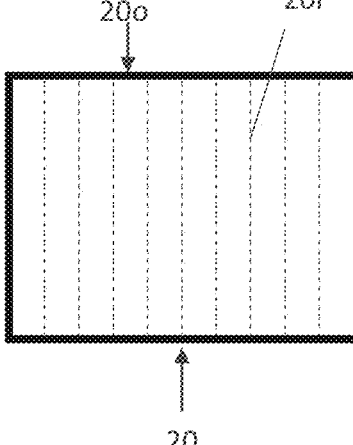
FIG. 8c illustrates a side view of a storage container.

The delivery container 40 comprising a base 40*a* and four walls 40*b*, 40*c* extending up from edges of the base 40*a*, thereby defining a top opening 40*o* of the delivery container 40. In FIG. 7 and FIG. 8*a*, the delivery container 40 is shown to comprise a guiding feature 40*gm* provided in the outwardly facing side of the walls 40*b* of the delivery container 40.

The Holder 30

The holder 30 comprises a plurality of vertical members 30*vr* coupled to each other by means of a rectangular bottom frame 30*bf* and a rectangular top frame 30*tf*. Hence, the vertical members 30*vr* are coupled to each other and are held in vertical alignment by means of the top frame 30*tf* and the bottom frame 30*bf*.

The vertical members 30*vr* comprises a number of vertical ribs or posts spaced apart, with their lower ends being coupled to the bottom frame 30*bf* and their upper ends being coupled to the top frame 30*tf*. The vertical members 30*vr* are arranged pairwise on opposing sides of the holder 30.

In FIG. 7, it can be seen that the holder 30 resembles a cage-like structure.

The top frame 30*tf* is defined with a top opening 30*to* indicated as a dashed rectangle in FIG. 6, to allow access to the delivery container from the top. The holder 30 is further defined with two side-access opening 30*o*, the first one indicated with a dashed line in FIG. 6 (left side-access opening) and the second one indicated in FIG. 7 (right side-access opening).

In the present embodiment, the vertical members 30*vr* are being movably engaged with and guided by the internal vertical recesses 20*r* of the storage container 20. The vertical members 30*vr* of the holder 30 and/or the storage container 20 may comprise a stop indicated as 20*st* and 30*st* in FIG. 9*c*, for preventing the holder 30 from being extended entirely out from the storage container 20. FIG. 9 shows the maximum extension of the holder 30 relative to the storage container 20.

Preferably, the holder 30 can be retrofitted into known storage containers 106.

Operation of the Storage Container Assembly

The operation of the storage container assembly 10 will now be described.

Figure 9A:
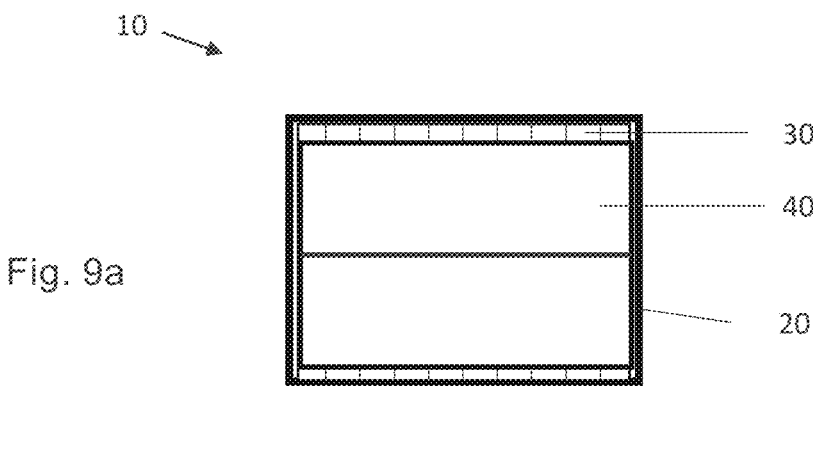
FIG. 9a illustrates a side view of the storage container assembly in the first state.

It is now referred to FIGS. 5 and 9*a*. Here a first state S1 is shown. Here, the delivery container 40 is retained within the holder 30, and the holder 30 with the delivery container 40 is retained within the storage container 20.

Figure 9B:
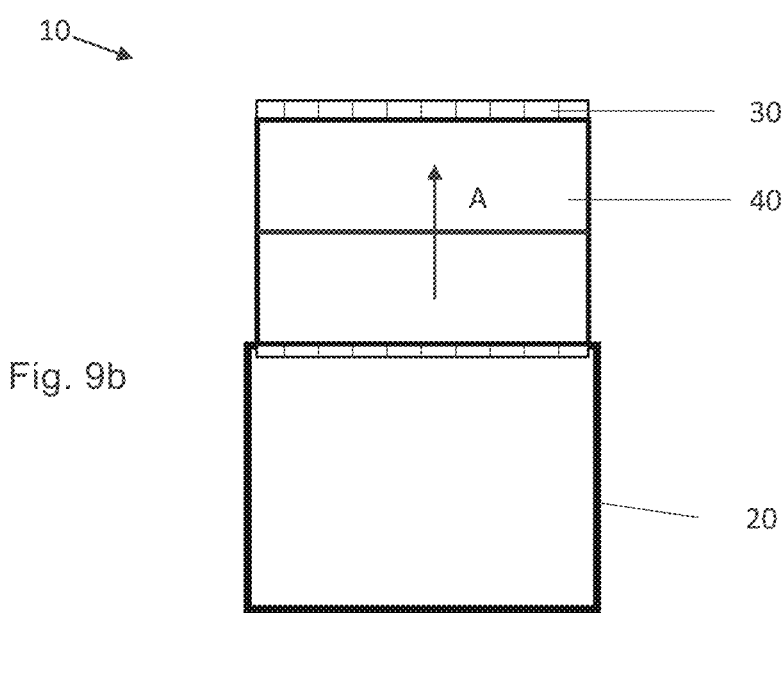
FIG. 9b illustrates a side view of the storage container assembly in the second state.

It is now referred to FIG. 5 and FIG. 9*b*. Here a second state S2 is shown. Here, the delivery container 40 is retained within the holder 30. As indicated by arrow A in FIG. 9*b*, the holder 30 together with the delivery container 40 is extended from the storage container 20. As the outer surface of the holder 30 is here sliding along the inner surface of the storage container 20, this is referred to as a telescopic extension of the holder 30 from the storage container 20.

Figure 9C:
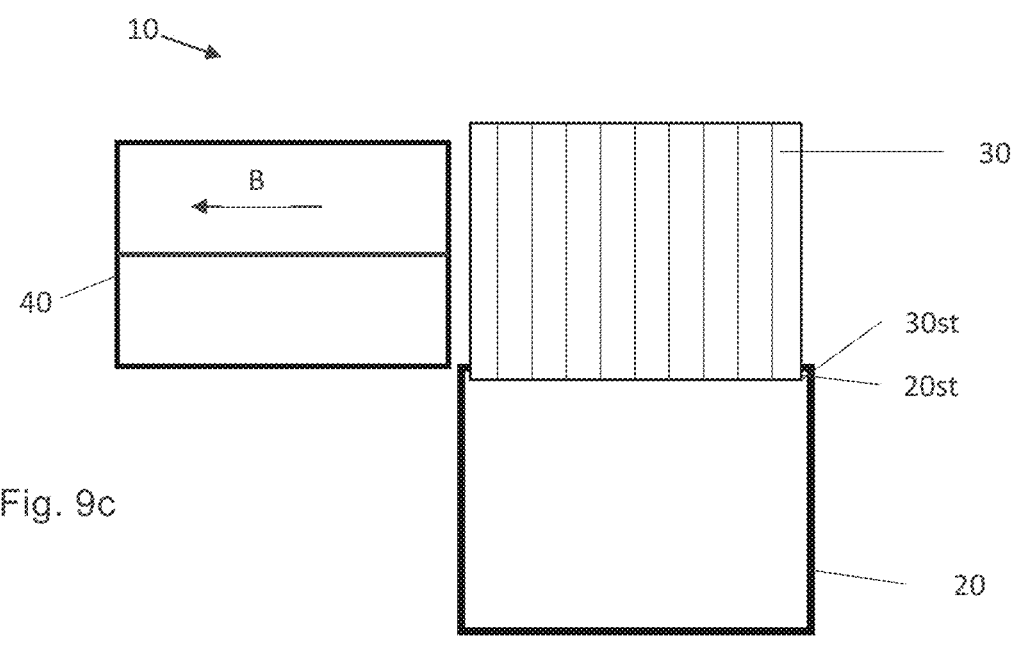
FIG. 9c illustrates a side view of the storage container assembly in the third state.
Figure 9D:
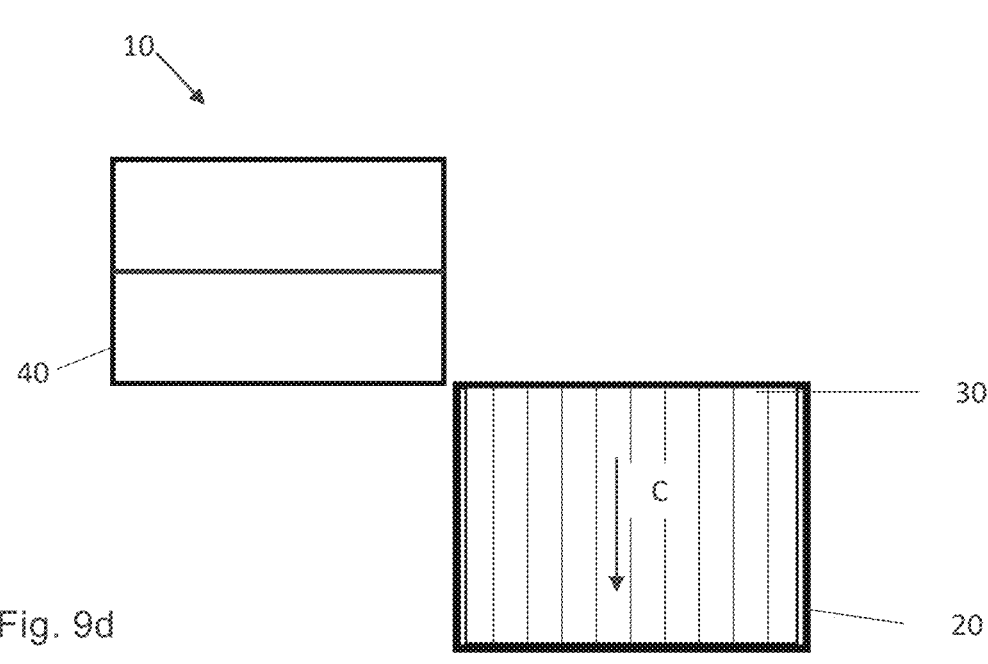
FIG. 9d illustrates a side view of the storage container assembly in the fourth state.

It is now referred to FIG. 7 and FIG. 9*c*. Here a third state S3 is shown. As indicated by arrow B in FIG. 9*c*, the delivery container 40 has been guided out from the side-access opening 30*so* in the holder 30. The delivery container 40 is here slidably moved relative to the holder 30, either by the base 40*a* being slidingly engaged with the bottom frame 30*bf* or by guiding features 40*gm* of the delivery container 40 being slidingly engaged with guiding features 30*gm* of the vertical members 30*vr* of the holder 30.

Consequently, the delivery container 40 may be retrieved from and inserted into the holder 30 similar to a drawer.

It should be noted that the side-access opening 30*so* is only revealed in when the holder 30 is extended from the storage container 20, i.e. in the second state S2 and in the third state S3. In the first state S1, both side-access openings 30*so* are blocked by the walls 20*c* of the storage container 20.

As is apparent from the drawings, movement in the direction A is a vertical movement, while movement in the direction B is a horizontal movement.

The holder 30 may be loaded with the same or a different delivery container 40 again, before the holder 30 is telescopically retained into the storage container 20. The storage container assembly is now considered to be in the first state again.

Alternatively, holder 30 may be telescopically retained into the storage container 20 without any delivery container 40. The storage container 20 with the holder 30 may now be used in the same way as the known storage container 106 until there is a need to use the storage container with the holder to receive a delivery container 40 again. In yet an alternative, the holder 30 may also be removed from the storage container 20 before the storage container is used as the known storage container 106.

Unloading and/or Loading Station 80

Figure 10A:
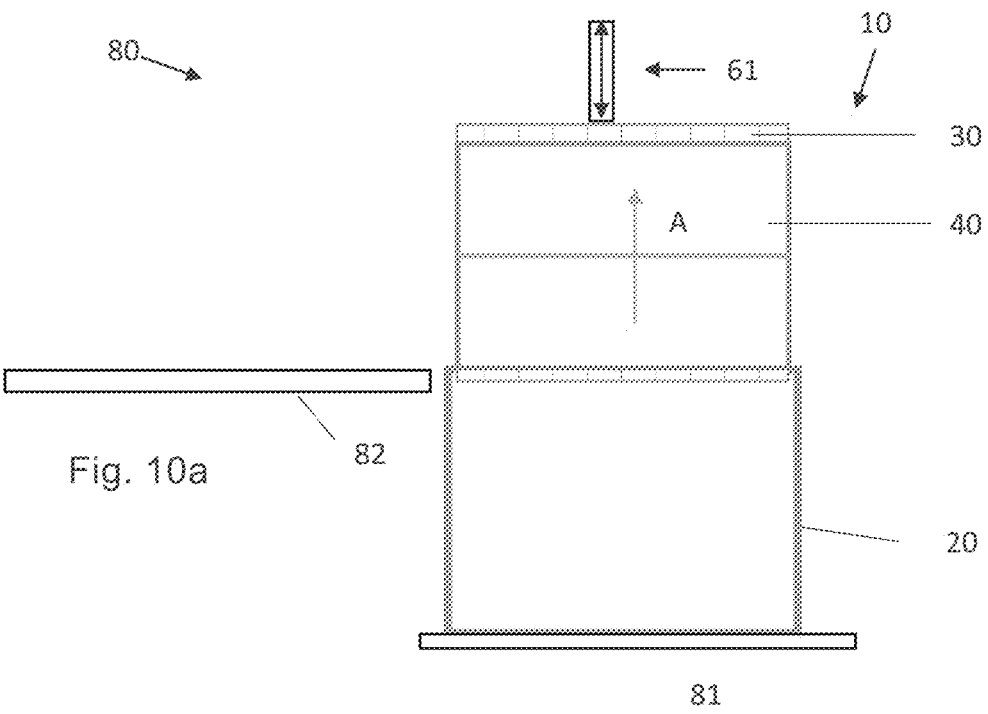
FIG. 10a-10c illustrate a loading/unloading station, where actuators are used to move the assembly between its respective states.
Figure 10B:
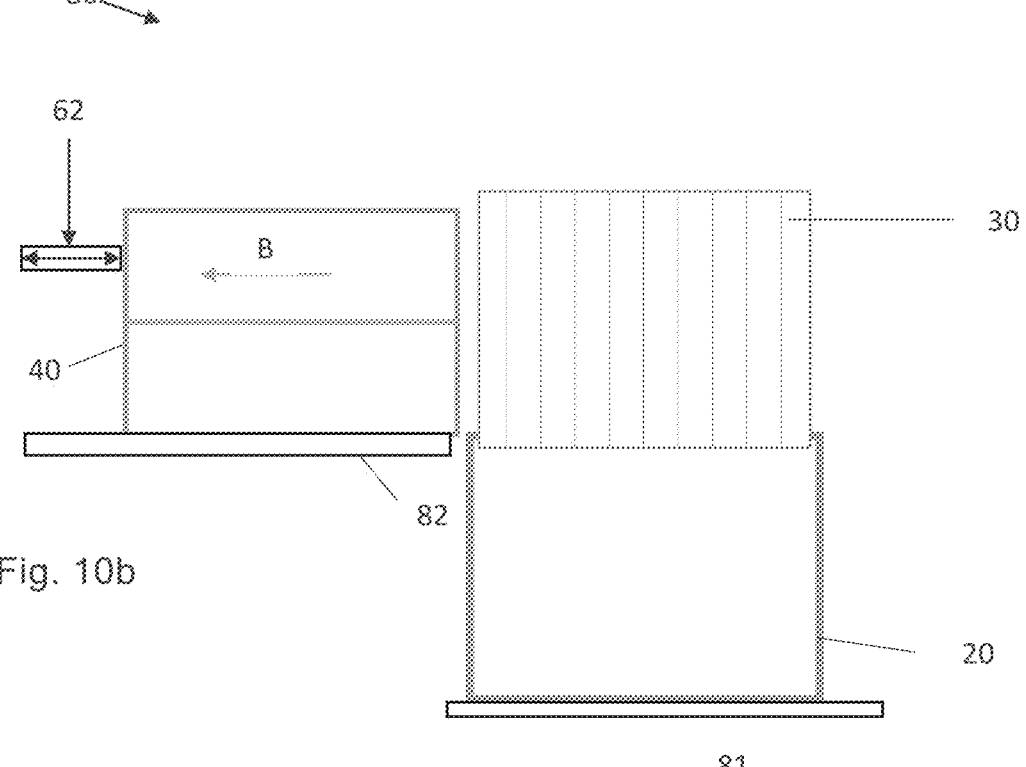

It is now referred to FIGS. 10*a* and 10*b*, where an unloading and/or loading station 80 is shown schematically. The storage container 20, the holder 30 and the delivery container 40 of the storage container assembly 10 are also shown.

The unloading and/or loading station 80 comprises a first position 81, which may be a position 81 on a conveyor or other type or carrier for a storage container 20 allowing the holder to be pulled up or pushed up from the storage container 20. In this first position, the holder 30 is pulled up or pushed up in the direction A from the storage container 20 by means of a first actuator 61. The same first actuator 61 may be used to lower the holder 30 into the storage container 20 again. It should be noted that in order for the holder 30 to be pushed up from the storage container 20, the base of the storage container 20 may be provided with one or more holes allowing the actuator 61 to push the holder 30 up.

The unloading and/or loading station 80 comprises a second position 82, which may be a position on a conveyor or other type or carrier for receiving the delivery container 40 from the holder 30. A second actuator 62 is here used to pull (alternatively push) the delivery container 40 out from the holder 30. The same actuator 62 may be used to insert a different or the same delivery container 40 into the holder 30 again.

As an example, the delivery container may be a cardboard box, where flaps of the cardboard box are temporarily folded sideways in contact with the outer surfaces of the cardboard box. Here, the delivery container has a top opening, allowing products to be inserted into the delivery container at ports. When all product items have been inserted into the delivery container, the delivery container may be transported to the unloading and/or loading station 80. In the second position 82, the flaps may be folded up to cover the top opening and the flaps may be secured in this position, either by tape, by glue, by properties of the flaps (for example a tuck top type of flap). Alternatively, a lid is fastened to the delivery container. This closing process may be performed automatically.

The now closed delivery container may now be inserted back into the holder 30 and further into the storage container, and may be transported into the stacks for storage or may be transported to a dispatching or shipping location.

Figure 10C:
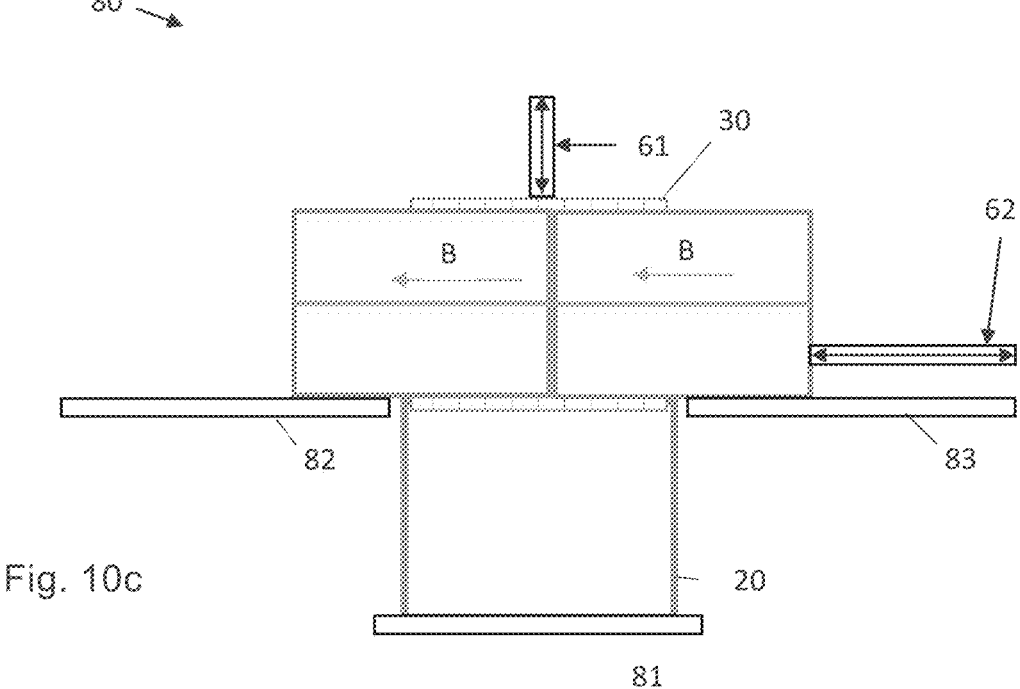

It is now referred to FIG. 10c. The unloading and/or loading station 80 here comprises a third position 83 in addition to the first and second positions 81, 82.

Here, the second actuator 62 is used to push a first delivery container 40 from the third position P3 into the holder 30 in the direction B. A second delivery container 40 which previously was located in the holder 30 will now be pushed out of the holder 30 to the second position P2 by the first delivery container 40.

In the preceding description, various aspects of the storage container assembly and the automated storage and retrieval system have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 prior art automated storage and retrieval system
10 storage container assembly
20 storage container
20 delivery container
20a base
20b, 20c four walls
20o top opening
20r vertical guides
30 holder
30bf bottom frame
30gm horizontal guide
30so side-access opening
30tf top frame
30vr vertical member
30to top opening
40 delivery container
40a base
40b, 40c four walls
40gm guiding features

40o top opening
61 first actuator
62 second actuator
80 unloading and/or loading station
81 first position
82 second position
83 third position
100 framework structure
102 upright members of framework structure
103 horizontal members of framework structure
104 storage grid
105 storage column
106 storage container
106' particular position of storage container
107 stack
108 rail system
110 parallel rails in first direction (x)
111 parallel rail in second direction (y)
112 access opening
119 first port column
120 second port column
201 prior art container handling vehicle
201a vehicle body of the container handling vehicle 201
201b drive means/wheel arrangement, first direction (x)
201c drive means/wheel arrangement, second direction (y)
301 prior art cantilever container handling vehicle
301a vehicle body of the container handling vehicle 301
301b drive means in first direction (x)
301c drive means in second direction (y)
304 gripping device
500 control system
CI connection interface
S1 first state
S2 second state
S3 third state
SI stacking interface
X first direction
Y second direction
Z third direction

The invention claimed is:

1. A storage container assembly for an automated storage and retrieval system, comprising:
a storage container comprising a base and four walls extending up from edges of the base, thereby defining a top opening of the storage container;
a delivery container comprising a base and four walls extending up from edges of the base; and
a holder for the delivery container being telescopically retained within the storage container and extendable from the top opening of the storage container, the holder having a side-access opening which is revealed on extension of the holder from the storage container, wherein the delivery container is configured to be guided into and out from the side-access opening of the holder and wherein the delivery container is configured to be slidably retained within the holder for storage within the storage container;
wherein the automated storage and retrieval system comprises a framework structure and a plurality of storage container assemblies, wherein the framework structure comprises upright members, a storage volume comprising storage columns provided between the upright members, wherein storage containers are stacked in stacks within the storage columns, a rail system provided on top of the upright members, and container handling vehicles arranged for movement on the rail system, and wherein the storage container assemblies are stacked in the stacks and handled in the same way as the storage containers by means of the container handling vehicles.

2. The storage container assembly according to claim 1, wherein the holder comprises a plurality of vertical members coupled to each other, the vertical members being movably engaged with and guided by vertical guides of the storage container.

3. The storage container assembly according to claim 2, wherein the holder comprises a top frame and a bottom frame, wherein the plurality of vertical members are coupled to each other and are held in vertical alignment by means of the top frame and the bottom frame.

4. The storage container assembly according to claim 3, wherein the top frame and the bottom frame are rectangular.

5. The storage container assembly according to claim 1, wherein the holder comprises a horizontal guide for guiding the delivery container into and out from a side-access opening of the holder.

6. The storage container assembly according to claim 5, wherein the horizontal guide is provided by a bottom frame guiding the base of the delivery container.

7. The storage container assembly according to claim 5, wherein the horizontal guide is provided by guiding features provided as part of respective vertical members, wherein the guiding features are movably engaged with corresponding guiding features provided as part of two of the walls of the delivery container.

8. The storage container assembly according to claim 1, wherein the storage container assembly is configured to be in the following states:

a first state in which the delivery container is retained within the holder and in which the holder is telescopically retained into the storage container;

a second state in which the delivery container is retained within the holder and in which the holder, together with the delivery container, is extended telescopically from the storage container;

a third state, in which the delivery container has been guided horizontally at least partially out from the side-access opening in the holder.

9. An automated storage and retrieval system comprising: a framework structure and a plurality of storage container assemblies, wherein the framework structure comprises:

upright members;

a storage volume comprising storage columns provided between the upright members, wherein storage containers are stacked in stacks within the storage columns;

a rail system provided on top of the upright members;

container handling vehicles arranged for movement on the rail system;

wherein the plurality of storage container assemblies each comprise:

a storage container comprising a base and four walls extending up from edges of the base, thereby defining a top opening of the storage container;

a delivery container comprising a base and four walls extending up from edges of the base;

a holder for the delivery container being telescopically retained within the storage container and extendable from the top opening of the storage container, the holder having a side-access opening which is revealed on extension of the holder from the storage container, wherein the delivery container is configured to be guided into and out from the side-access opening of the holder, wherein the delivery container is configured to be slidably retained within the holder for storage within the storage container, and wherein the storage container assemblies are stacked in the stacks and handled in the same way as the storage containers by means of the container handling vehicles.

10. The automated storage and retrieval system according to claim 9, wherein the system further comprises a loading and/or unloading station comprising:

a first actuator for extending the holder telescopically relative to the storage container; and a second actuator for moving the delivery container relative to the holder.

11. A method for unloading of a delivery container from, or for loading of the delivery container into, a storage container of an automated storage and retrieval system, wherein the automated storage and retrieval system comprises a framework structure and a plurality of storage container assemblies, wherein the framework structure comprises upright members, a storage volume comprising storage columns provided between the upright members, wherein storage containers are stacked in stacks within the storage columns, a rail system provided on top of the upright members, and container handling vehicles arranged for movement on the rail system, and wherein each of the storage container assemblies comprises a storage container comprising a base and four walls extending up from edges of the base, thereby defining a top opening of the storage container, a delivery container comprising a base and four walls extending up from edges of the base, and a holder for the delivery container being telescopically retained within the storage container and extendable from the top opening of the storage container, the holder having a side-access opening which is revealed on extension of the holder from the storage container; wherein the delivery container is configured to be guided into and out from the side-access opening of the holder; wherein the delivery container is configured to be slidably retained within the holder for storage within the storage container, and wherein the storage container assemblies are stacked in the stacks and handled in the same way as the storage containers by means of the container handling vehicles; wherein the method comprises:

moving the storage container from a storage position to an unloading and/or loading station;

extending a holder through a top opening of the storage container; and guiding the delivery container into and/or out from a side-access opening of the holder.

\* \* \* \* \*